US012240597B2

(12) United States Patent
Bender

(10) Patent No.: US 12,240,597 B2
(45) Date of Patent: Mar. 4, 2025

(54) AIRCRAFT WITH WING HAVING INTEGRATED DUCTED FANS

(71) Applicant: Dr. Ing. h.c. F. Porsche Aktiengesellschaft, Stuttgart (DE)

(72) Inventor: Stefan Bender, Loechgau (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 550 days.

(21) Appl. No.: 17/385,931

(22) Filed: Jul. 27, 2021

(65) Prior Publication Data

US 2022/0033072 A1 Feb. 3, 2022

(30) Foreign Application Priority Data

Jul. 31, 2020 (DE) ...................... 10 2020 120 266.0

(51) Int. Cl.
*B64C 29/00* (2006.01)
*B64C 3/18* (2006.01)
*B64D 27/24* (2006.01)
*B64D 31/00* (2006.01)

(52) U.S. Cl.
CPC .......... *B64C 29/0025* (2013.01); *B64C 3/187* (2013.01); *B64D 27/24* (2013.01); *B64D 31/00* (2013.01)

(58) Field of Classification Search
CPC .. B64C 29/0025; B64U 30/295; B64D 27/24; B64D 27/31; B64D 27/40; B64D 27/402
See application file for complete search history.

(56) References Cited

U.S. PATENT DOCUMENTS

| 3,088,695 | A | 5/1963 | Donald |
| 4,469,294 | A | 9/1984 | Clifton |
| 6,561,456 | B1 | 5/2003 | Devine |
| 7,857,254 | B2 * | 12/2010 | Parks ................. B64C 29/0041 244/12.4 |
| 8,393,564 | B2 * | 3/2013 | Kroo ...................... B64C 27/08 244/6 |
| 9,845,150 | B2 * | 12/2017 | Kroo ......................... B64C 3/56 |
| 10,543,905 | B1 | 1/2020 | Kwon et al. |
| 10,703,467 | B2 * | 7/2020 | Tovkach ............. B64C 29/0025 |

(Continued)

FOREIGN PATENT DOCUMENTS

| CN | 104691751 A | 6/2015 |
| DE | 1200140 B | 9/1965 |

(Continued)

OTHER PUBLICATIONS

Michael Duffy, et al., "Propulsion Scaling Methods in the Era of Electric Flight", 2018 AIAA/IEEE Electric Aircraft Technologies Symposium, Jul. 9-11, 2018, pp. 1-24, AIAA Propulsion and Energy Forum, Cincinnati, Ohio, USA.

*Primary Examiner* — Philip J Bonzell
(74) *Attorney, Agent, or Firm* — LEYDIG, VOIT & MAYER, LTD.

(57) ABSTRACT

An aircraft includes a wing with integrated ducted fans and ribs. Each respective ducted fan comprises a duct ring, a guide grille arranged within the duct ring, and an electric motor supported by the guide grille. The ribs are integrated into the guide grille. Each respective electric motor can be cylindrical, and the ribs can run tangentially along the electric motors.

14 Claims, 3 Drawing Sheets

(56) References Cited

U.S. PATENT DOCUMENTS

| | | | |
|---|---|---|---|
| 11,001,377 B1* | 5/2021 | Robinson | B64C 29/00 |
| 11,661,179 B2* | 5/2023 | Matsui | B64C 11/001 |
| | | | 244/7 R |
| 2006/0113425 A1* | 6/2006 | Rader | B64C 25/32 |
| | | | 244/17.11 |
| 2018/0178907 A1* | 6/2018 | Tovkach | B64C 39/024 |
| 2020/0148354 A1 | 5/2020 | Morris et al. | |
| 2022/0097835 A1* | 3/2022 | Matsui | B64C 29/0025 |
| 2022/0097836 A1* | 3/2022 | Matsui | B64C 29/0025 |

FOREIGN PATENT DOCUMENTS

| | | |
|---|---|---|
| DE | 1205392 B | 11/1965 |
| DE | 1209001 B | 1/1966 |
| DE | 202015003815 U1 | 7/2015 |
| EP | 3492377 A1 | 6/2019 |

\* cited by examiner

AIRCRAFT WITH WING HAVING INTEGRATED DUCTED FANS

CROSS REFERENCE TO RELATED APPLICATIONS

This application claims benefit to German Patent Application No. DE 10 2020 120 266.0, filed on Jul. 31, 2020, which is hereby incorporated by reference herein.

FIELD

The present disclosure relates to an aircraft, and in particular, to a fully electric vertical take-off and landing (VTOL) aircraft.

BACKGROUND

VTOL is the cross-language name given in the aerospace industry to any type of aircraft, drone or rocket that has the capability of lifting off and landing again substantially vertically and without a runway. This collective term is used below in a broad sense that includes not just fixed-wing aircraft with wings, but rather also rotary-wing aircraft such as helicopters, gyrocopters, gyrodynes and hybrids such as composite or combination helicopters and convertiplanes. Short take-off and landing (STOL) aircraft, short take-off and vertical landing (STOVL) aircraft and vertical take-off and horizontal landing (VTHL) aircraft are also included.

U.S. Pat. No. 10,543,905 B1, EP 3 492 377 A1 and CN 104691751 A each disclose a supporting assembly formed from stators and/or supporting arms of the individual rotors.

US 2020/0148354 A1 proposes fastening the rotors to stators which run in parallel.

SUMMARY

In an embodiment, the present disclosure provides an aircraft. The aircraft includes a wing with integrated ducted fans and ribs. Each respective ducted fan comprises a duct ring, a guide grille arranged within the duct ring, and an electric motor supported by the guide grille. The ribs are integrated into the guide grille.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

The present disclosure provides an aircraft, in particular a fully electric vertical take-off and landing aircraft in the above sense.

Here, the approach is based on the insight that a VTOL aircraft that can be used in urban environments requires drive units which are capable of handling every phase of flight (take-off, transition, cruise and landing) but which should at the same time satisfy the stringent design principles of lightweight structure and system construction.

For the lift-off of the aircraft, it is therefore the case that, instead of an exposed rotor, ducted fans are provided which are integrated into the wing surface, such as are known, outside the aerospace sector, for example from hovercraft or swamp craft. The cylindrical housing surrounding the respective lift rotor, the so-called duct ring, is in this case capable of reducing the shear losses that occur in the case of conventional fans owing to turbulence at the blade tips.

According to the present disclosure, for this purpose, the ducted fans are incorporated into the wing, which is of spar and rib construction, such that the ribs of said wing are, in certain sections, formed as a single piece with the guide grilles (stators) of the fans.

By means of this functional integration, separate ribs can be omitted, which considerably reduces the weight and costs of the aircraft. It furthermore allows an improved introduction of the motor forces and torques into the wing structure.

Further advantageous configurations are specified herein. In addition to fully autonomous operation of the aircraft, it is also possible to consider granting manual control to human pilots if they are sufficiently qualified, which gives the proposed aircraft the greatest possible flexibility in terms of handling.

An exemplary embodiment is equipped with two exposed lift rotors, which can be folded in, to both sides of the nose—hereinafter referred to as "nose lift units"—, a total of six encased lift rotors, equipped with slats, in the wings on both sides—hereinafter referred to as "wing lift units"—and two fans at the rear with elongate ducts—hereinafter referred to as "cruise thrust units". (In this context, the expression "fan" is always used in a broad sense, which encompasses equally the cruise thrust units, which serve primarily for propulsion, on the one hand, and the nose and wing lift units, which serve primarily for lift, on the other hand; correspondingly, encased thrust and lift units are referred to equally as "ducted fans"). In the cruise and ground configuration, the slats of the wing lift units are closed and the nose lift units are folded in under or into the fuselage; by contrast, during hovering, the slats of the wing lift units are open, and both nose lift units are folded out to the sides.

Figure 1:
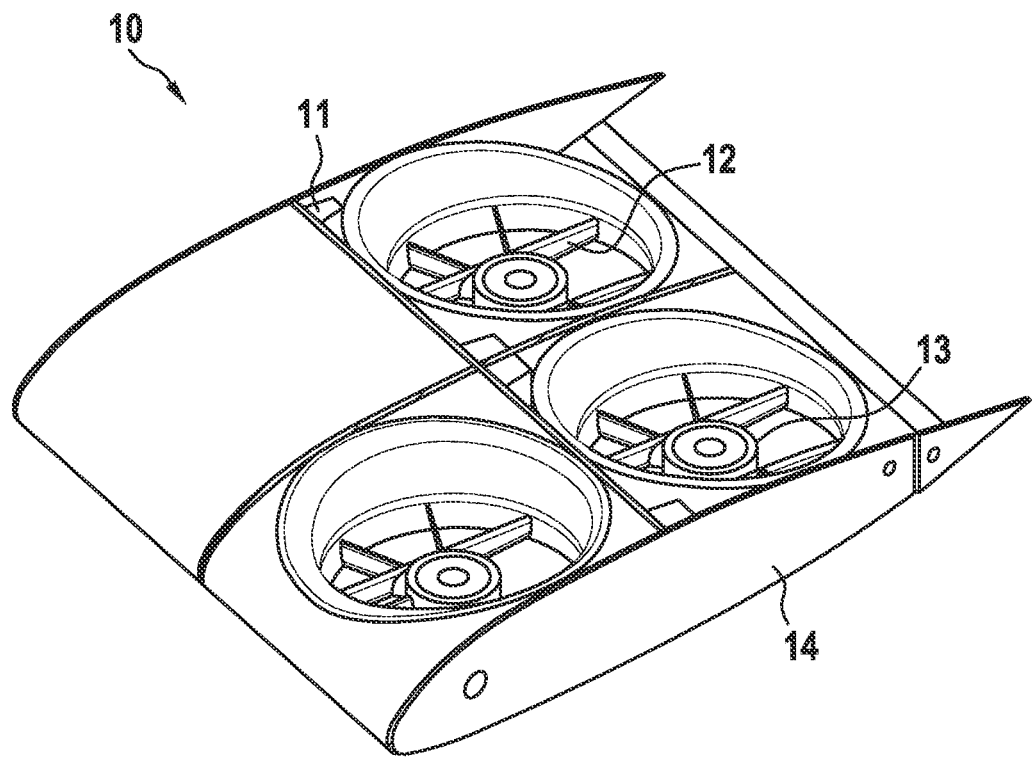
FIG. 1 shows a perspective view of a wing.

Proceeding from this configuration, FIG. 1 illustrates the construction of a wing (10), illustrated with partially transparent cladding and outer skin, of semi-open spar and rib construction. The three aerodynamically shaped ribs (14) run equidistantly and parallel with respect to one another along three ducted fans which are integrated as wing lift units into the wings (10) and whose guide grille (12), which is arranged within the duct ring (11), bears in each case a central electric motor (13). Here, and below, the expression "rib" is understood in a broad sense which encompasses all structural parts of the wing (10) that run, substantially transversely with respect to the spars, between torsion nose (D-box) and any end strip. In turn, in compliance with the German aviation regulations, a "structural part" refers to any component which could make a major contribution to the accommodation of flight, ground or pressure loads, and the failure of which could lead to a total failure of the aircraft.

Figure 2:
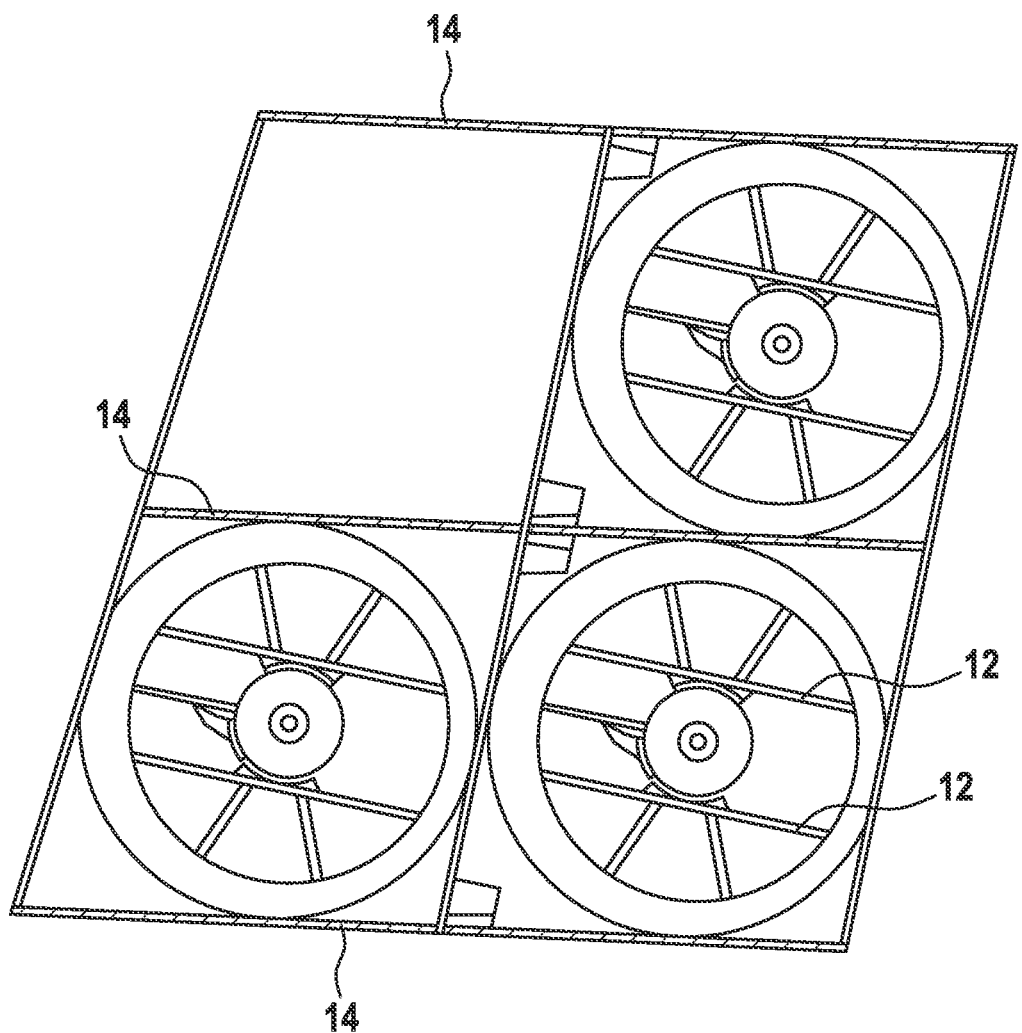
FIG. 2 shows a plan view of the wing as per FIG. 1.

As can be seen from the plan view of FIG. 2, each of the three cylindrical electric motors (13—FIG. 1) is screwed radially to the respective guide grille (12), the struts of which, manufactured from carbon-fibre-reinforced plastic (CFRP), support the electric motor (13) in an axially and rotationally symmetrical arrangement from opposite sides.

In the illustrated configuration, two of the struts of each guide grille (12) run parallel to one another in the incident-flow direction of the wing (10) and tangentially flank the associated electric motor (13). In each case two beams, joined to said webs, combine with the beams of the respective other web, which are situated diametrically oppositely in relation to the electric motor (13), to form a St Andrew's or diagonal cross and stiffen the electric motor (13) such that the guide grille (12) accommodates all horizontal forces in the plane of the motor. As can be seen more clearly from FIG. 1, the struts of the guide grille (12) have, for this purpose, a width which corresponds approximately to the height of the electric motor (13).

Figure 3:
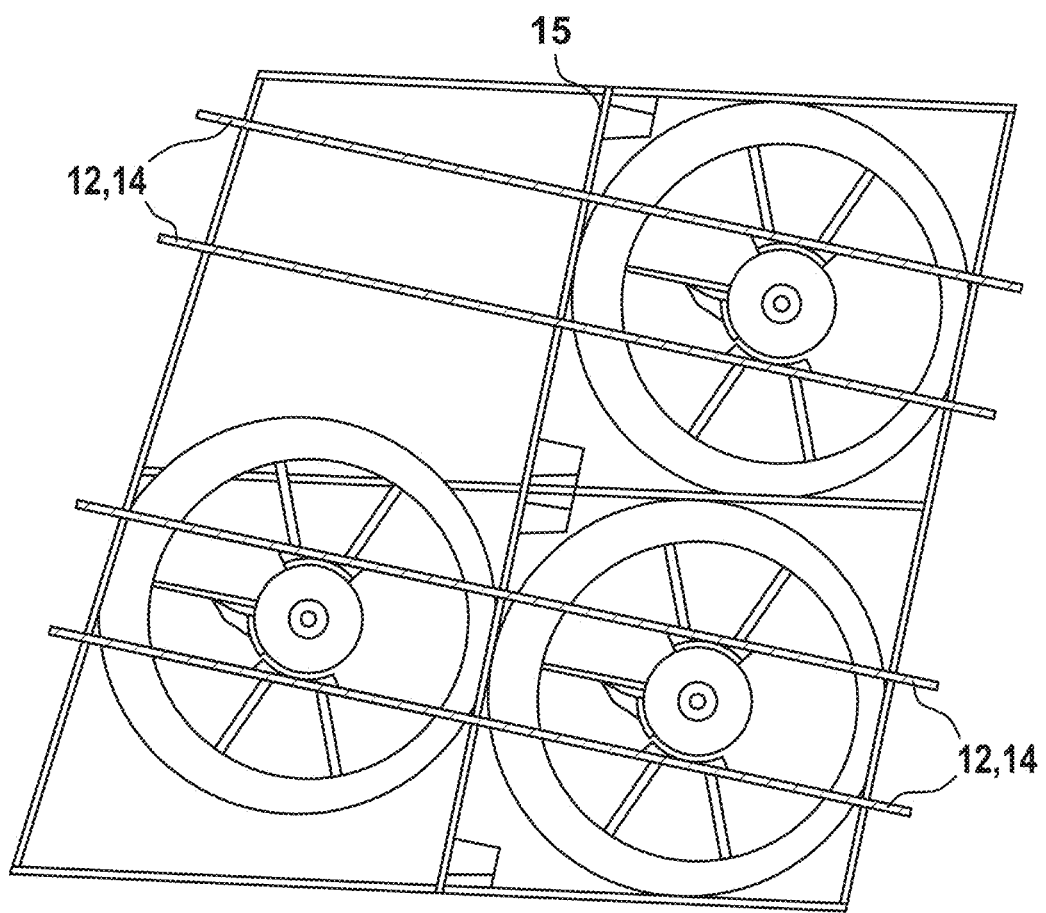
FIG. 3 shows the plan view, corresponding to FIG. 2, of an improved wing.

FIG. 3 directs the viewer's attention to the functional integration, which is essential to the invention, of guide grilles (12) and ribs (14). In the present embodiment, for this purpose, four ribs (14)—which run at right angles to the main spar 15 and end strip of the wing (10)—are provided which, in each case pairwise, enclose one or two of the electric motors (13) and thus replace the tangentially running struts of the guide grille (12) thereof as per FIG. 2. The two electric motors (13) situated at the inside in the span direction, which are at the bottom in the figure, are in this case arranged one behind the other with respect to the incident-flow direction, such that the adjacent ribs (14), in their longitudinal direction, flank both electric motors (13) simultaneously. The two ribs (14) which are situated at the outside in the span direction, and which are thus at the top in the figure, flank only the electric motor (13) of a single ducted fan that is adjacent to the end strip.

In the plan view in the figure, the wing can thus be divided approximately into quadrants, only three of which are occupied by ducted fans oriented axially parallel.

In the present embodiment, the electric motor (13) is designed as an air-cooled internal-rotor motor with integrated controller. It is self-evident that, in an alternative configuration, use may for example be made of an external-rotor motor or a liquid-type cooling arrangement without departing from the scope of the invention. Further exemplary options are disclosed for example by DUFFY, Michael, et al. Propulsion scaling methods in the era of electric flight. in: 2018 *AIAA/IEEE Electric Aircraft Technologies Symposium* (*EATS*). IEEE, 2018. pp. 1-23.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An aircraft, comprising:
   a wing with integrated ducted fans, spars, and ribs, the wing being an airfoil,
   wherein each respective ducted fan comprises a duct ring, a guide grille arranged within the duct ring, and an electric motor supported by the guide grille,
   wherein the ribs are integrated into the guide grille,
   wherein the ribs are straight and extend from a leading edge of the wing to a trailing edge of the wing,
   wherein the guide grilles are configured as stators,
   wherein the spars include a first spar, a second spar, and a third spar, the second spar being arranged between the first and third spars and being parallel to the third spar,
   wherein the first spar is arranged at the leading edge of the wing and the third spar is arranged at the trailing edge of the wing, the first spar being arranged at an angle relative to the second and third spars, and
   wherein the ribs are perpendicular to the second and third spars.

2. The aircraft as claimed in claim 1, wherein each of the electric motors comprises an integrated controller.

3. The aircraft as claimed in claim 1, wherein the aircraft is able to be selectively controlled in a fully autonomous manner.

4. The aircraft as claimed in claim 1, wherein the ribs are aerodynamically shaped to form the airfoil.

5. The aircraft as claimed in claim 1, wherein the second and third spars form opposing sides of a parallelogram surrounding at least one of the ducted fans.

6. The aircraft as claimed in claim 1, wherein the electric motors are cylindrical, and
   wherein the ribs run tangentially along the electric motors.

7. The aircraft as claimed in claim 6, wherein the ribs run parallel to one another, and
   wherein each of the electric motors is enclosed tangentially by two of the ribs.

8. The aircraft as claimed in claim 7, wherein at least two of the electric motors are enclosed by the same ribs.

9. The aircraft as claimed in claim 1, wherein at least two of the ducted fans are arranged one behind the other with respect to an intended incident-flow direction of the wing, or
   wherein at least two of the ducted fans are arranged adjacent to one another with respect to an intended incident-flow direction of the wing.

10. The aircraft as claimed in claim 9, wherein the ribs extend through the wing in the incident-flow direction.

11. The aircraft as claimed in claim 1, wherein the wing is configured to provide aerodynamic lift.

12. The aircraft as claimed in claim 11, wherein the wing provides lift independent of lift provided by the ducted fans.

13. The aircraft as claimed in claim 1, wherein each rib forms a single piece with at least part of at least one guide grille.

14. The aircraft as claimed in claim 13, wherein at least two ribs each form a single piece with two guide grilles.

* * * * *